(12) United States Patent
Ishida

(10) Patent No.: US 9,432,541 B2
(45) Date of Patent: Aug. 30, 2016

(54) TRANSFER CONTROLLING METHOD, TRANSFER CONTROLLING APPARATUS, AND STORAGE MEDIUM STORING PROGRAM

(71) Applicant: CANON KABUSHIKI KAISHA, Tokyo (JP)

(72) Inventor: Tomoya Ishida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/744,405

(22) Filed: Jun. 19, 2015

(65) Prior Publication Data

US 2016/0006884 A1 Jan. 7, 2016

(30) Foreign Application Priority Data

Jul. 4, 2014 (JP) ................. 2014-139164

(51) Int. Cl.
*H04N 1/04* (2006.01)
*H04N 1/00* (2006.01)

(52) U.S. Cl.
CPC ................. *H04N 1/0083* (2013.01)

(58) Field of Classification Search
CPC ........... G06F 17/30893; G06F 3/1207; G06F 3/1259; G06F 17/30017; G06F 3/1297; G06T 9/008; G06T 9/005; G06T 11/00; G06T 1/0028; G06T 1/005; G06T 1/0057; G06T 1/0064; G06T 1/60; G06T 2200/28
USPC ....... 382/232, 253, 233, 254, 100, 112, 166, 382/239, 240, 282, 294, 298, 305; 357/E7.209, 240.22, E7.226, 240.12, 357/240.14; 358/1.13, 1.15, 1.2, 1.16, 1.1, 358/1.17, 1.6, 1.9, 426.02, 246.05, 426.06, 358/426.12, 426.13, 426.14, 448, 451, 539; 709/201, 217, 223, 247; 399/8
See application file for complete search history.

(56) References Cited

U.S. PATENT DOCUMENTS

| | | | | |
|---|---|---|---|---|
| 6,154,779 A * | 11/2000 | Otani | ................. | H04N 1/32128 358/404 |
| 6,177,934 B1 * | 1/2001 | Sugiura | ............. | H04N 1/00236 715/748 |
| 6,185,329 B1 * | 2/2001 | Zhang | ................. | G06K 9/3266 358/462 |
| 8,500,381 B2 * | 8/2013 | Tanaka | .................. | G06K 15/00 358/1.1 |
| 8,553,130 B2 * | 10/2013 | Yoshimi | ............. | G06F 3/03547 348/333.05 |
| 8,817,328 B2 * | 8/2014 | Miyamoto | ......... | H04N 1/00222 358/1.13 |
| 2002/0054351 A1 * | 5/2002 | Kageyama | ............. | G06K 15/02 358/1.18 |
| 2005/0179940 A1 | 8/2005 | Konji et al. | ................. | 358/1.15 |
| 2006/0176196 A1 * | 8/2006 | Sugita | ..................... | H03M 7/40 341/60 |
| 2007/0025627 A1 * | 2/2007 | Hasegawa | ............... | H04N 1/41 382/239 |
| 2008/0018744 A1 * | 1/2008 | Sasaki | ............... | H04N 1/00278 348/207.2 |

(Continued)

FOREIGN PATENT DOCUMENTS

JP 2005-215954 8/2005

*Primary Examiner* — Negussie Worku

(74) *Attorney, Agent, or Firm* — Fitzpatrick, Cella, Harper & Scinto

(57) ABSTRACT

The data format of image data when an image reading apparatus transfers, to an external apparatus, the image data obtained by reading an original by the image reading apparatus is decided based on system configuration information of the image reading apparatus and setting information corresponding to processing to be executed on the image data in the external apparatus. Control for transferring, from the image reading apparatus to the external apparatus, the image data of the decided data format is performed.

20 Claims, 10 Drawing Sheets

(56) References Cited

U.S. PATENT DOCUMENTS

| | | | |
|---|---|---|---|
| 2010/0296120 A1* | 11/2010 | Hanano | H04N 1/00236 358/1.15 |
| 2013/0100492 A1* | 4/2013 | Yamazaki | G06F 3/1212 358/1.15 |
| 2013/0188065 A1* | 7/2013 | Wegener | H04N 21/2381 348/207.99 |
| 2015/0026672 A1* | 1/2015 | Ishida | G06F 8/65 717/170 |
| 2015/0288843 A1* | 10/2015 | Ishida | H04N 1/2032 358/450 |

* cited by examiner

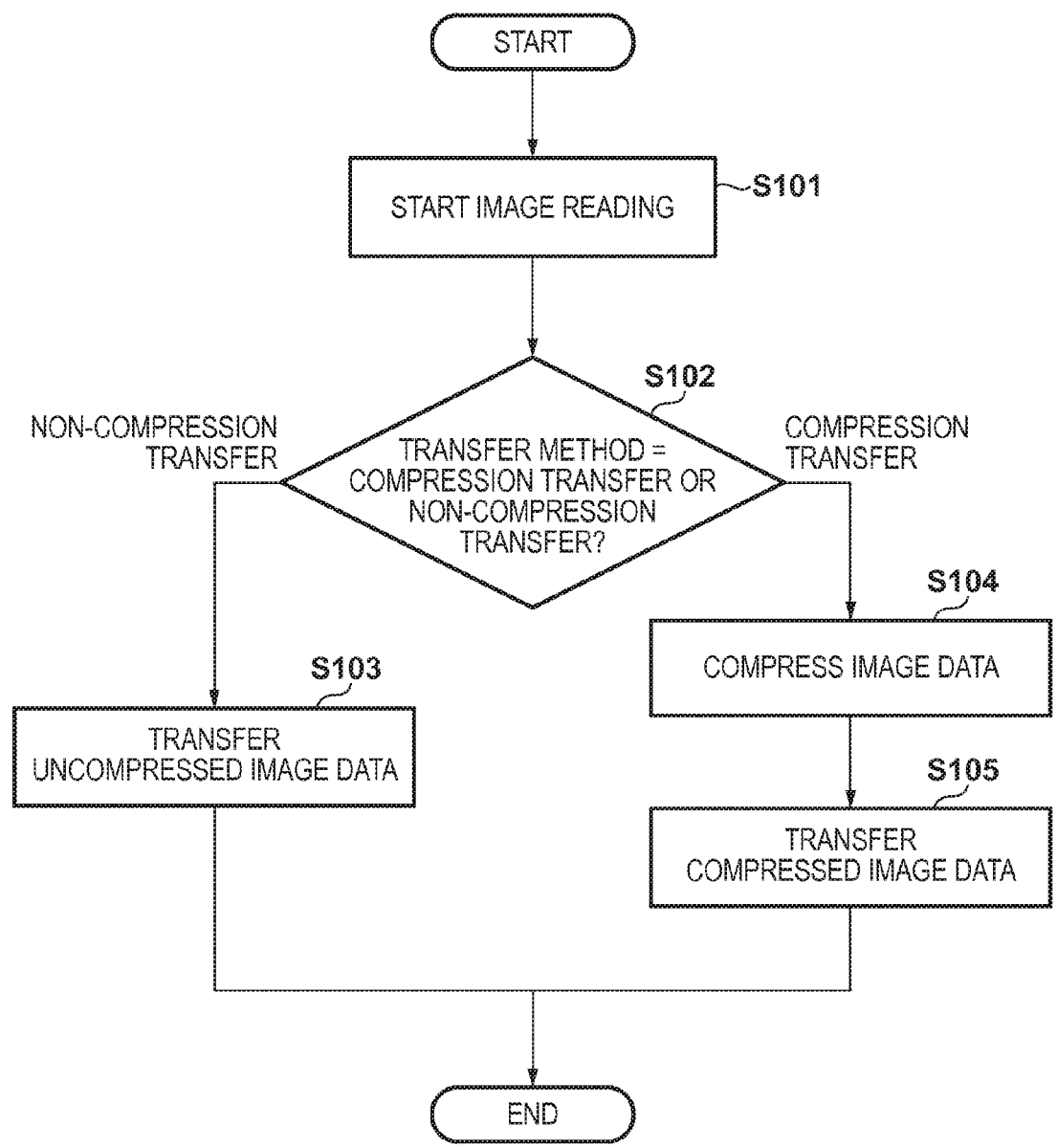

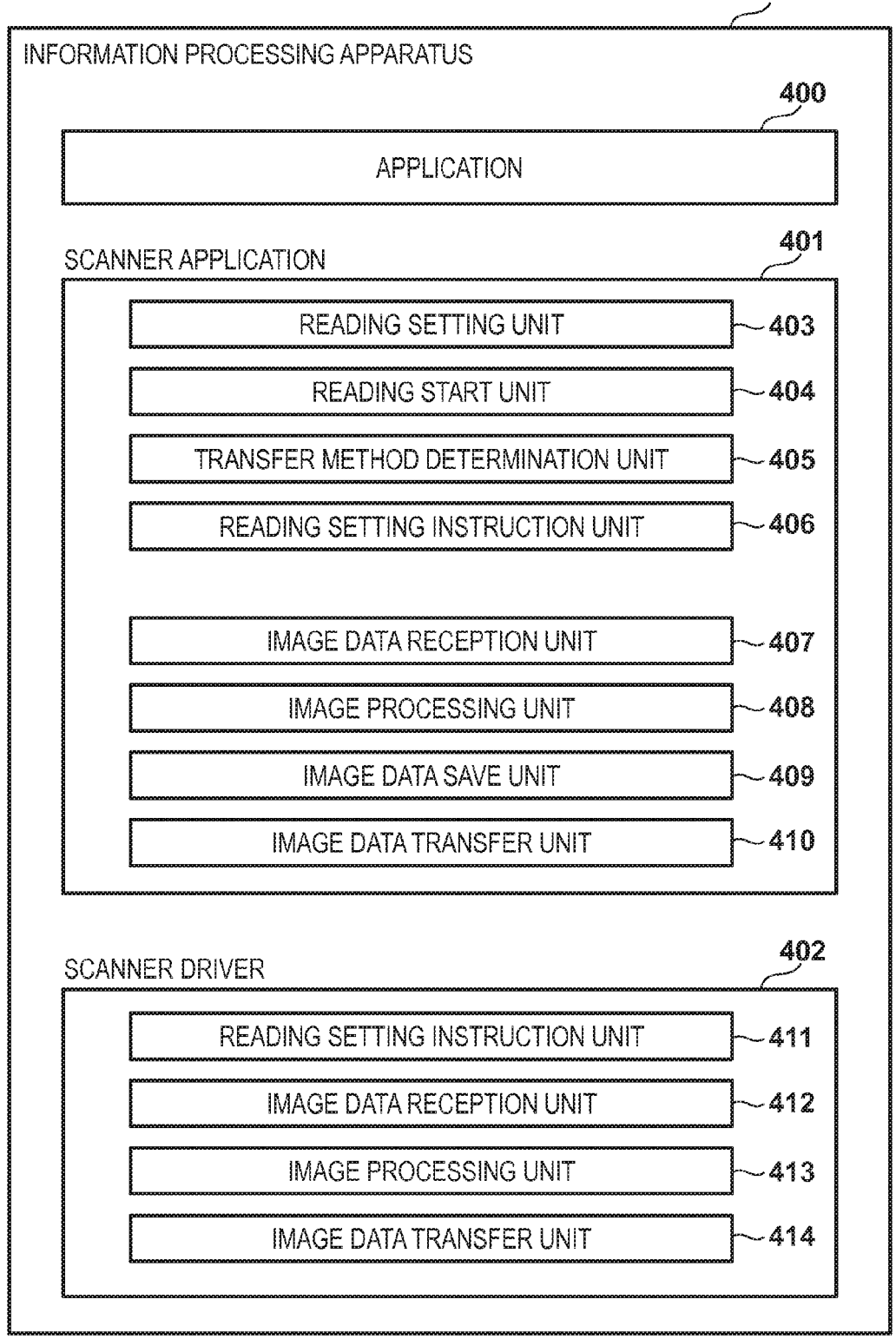

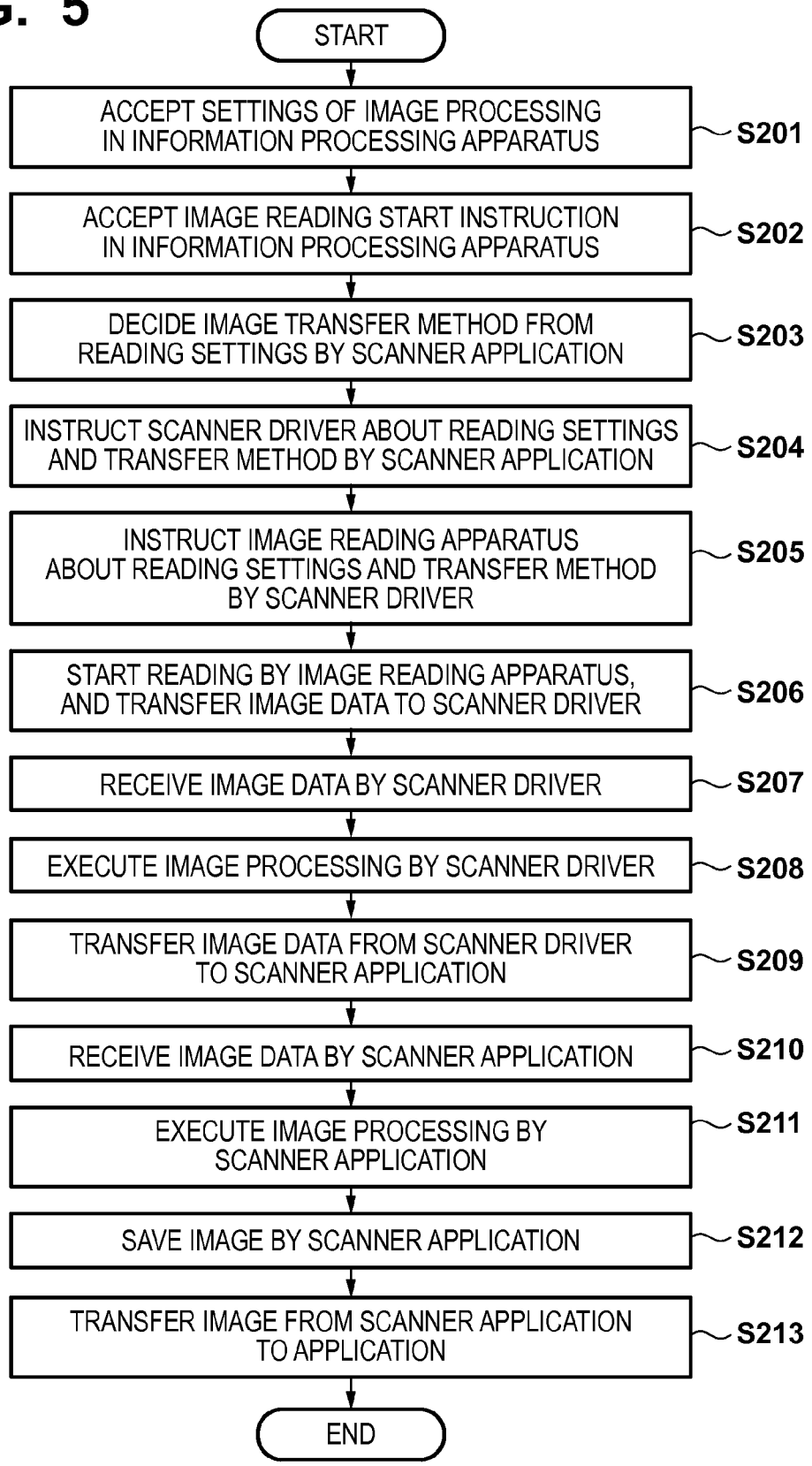

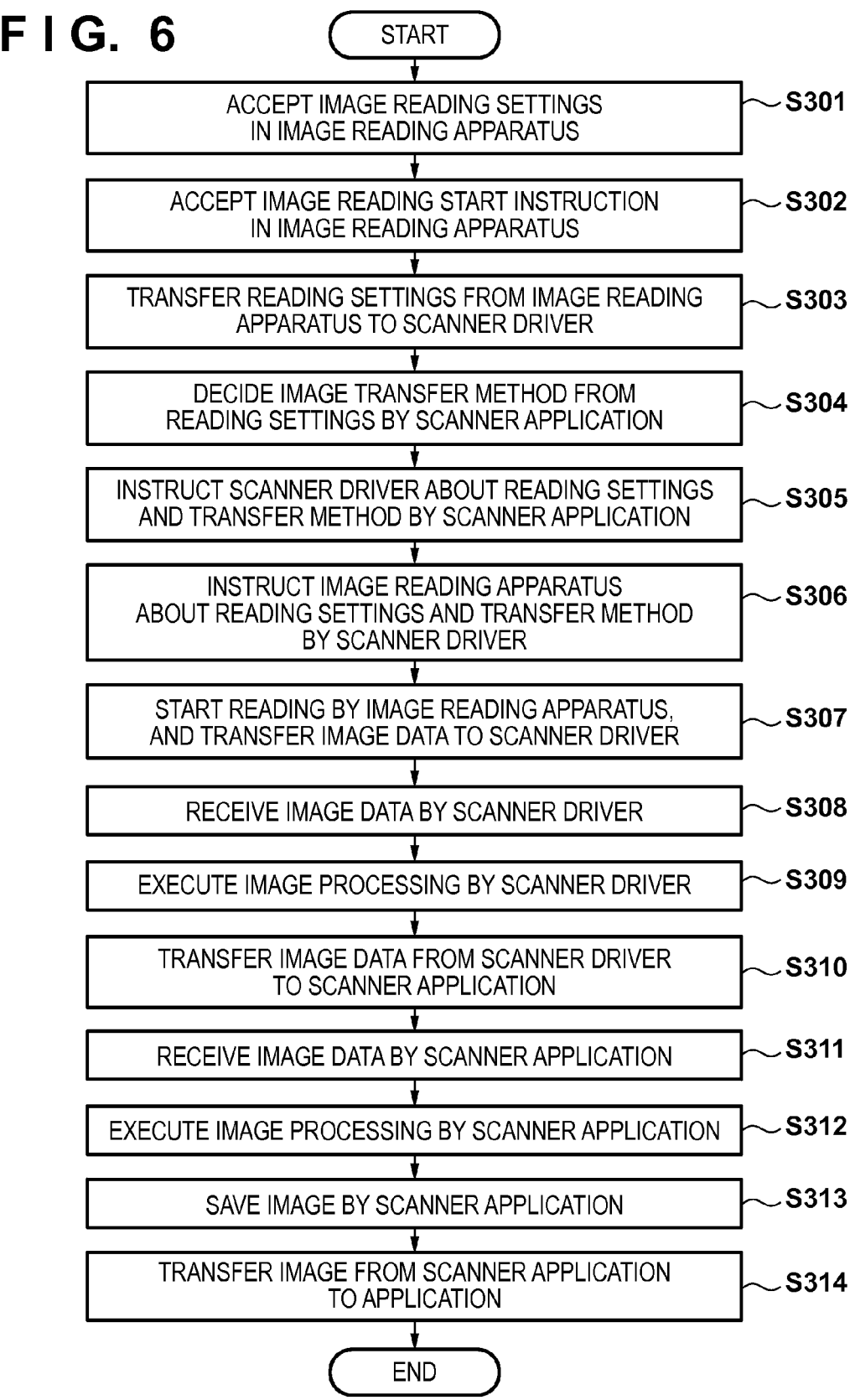

701 — LOADING SETTING

| ORIGINAL TYPE | DOCUMENT ▼ | ~704 |
| COLOR MODE | COLOR ▼ | ~705 |
| RESOLUTION | 300dpi ▼ | ~706 |
| IMAGE PROCESSING SETTING | ☐ DETECT ORIENTATION OF TEXT ORIGINAL AND ROTATE IMAGE | ~707 |

702 — SAVE SETTING

| FILE NAME | IMG | ~708 |
| SAVE LOCATION | DOCUMENT FOLDER ▼ | ~709 |
| DATA FORMAT | PDF ▼ | ~710 |

703 — APPLICATION SETTING

| TRANSFER TO APPLICATION ⦿ | APPLICATION A ▼ | ~711 |
| ATTACH TO MAIL ○ | MAILER B ▼ | ~712 |
| EXECUTE OCR ○ | OCR APPLICATION C ▼ | ~713 |

FIG. 8

| INTERFACE | READING METHOD | SAVE FORMAT | SPECIFIC IMAGE PROCESSING | TRANSFER METHOD |
|---|---|---|---|---|
| USB | Book | JPEG/PDF | ON | NON-COMPRESSION TRANSFER |
| | | | OFF | NON-COMPRESSION TRANSFER |
| | | TIFF/PNG | ON | NON-COMPRESSION TRANSFER |
| | | | OFF | NON-COMPRESSION TRANSFER |
| | ADF | JPEG/PDF | ON | COMPRESSION TRANSFER |
| | | | OFF | COMPRESSION TRANSFER |
| | | JPEG/PDF | ON | COMPRESSION TRANSFER |
| | | | OFF | COMPRESSION TRANSFER |
| LAN | Book | JPEG/PDF | ON | NON-COMPRESSION TRANSFER |
| | | | OFF | COMPRESSION TRANSFER |
| | | TIFF/PNG | ON | NON-COMPRESSION TRANSFER |
| | | | OFF | NON-COMPRESSION TRANSFER |
| | ADF | JPEG/PDF | ON | COMPRESSION TRANSFER |
| | | | OFF | COMPRESSION TRANSFER |
| | | JPEG/PDF | ON | COMPRESSION TRANSFER |
| | | | OFF | COMPRESSION TRANSFER |

| 900 INTER-FACE | 901 READING METHOD | 902 SAVE FORMAT | 903 SPECIFIC IMAGE PROCESSING | 904 TRANSFER DESTINATION APPLICATION | 905 TRANSFER METHOD | |
|---|---|---|---|---|---|---|
| USB | Book | JPEG/PDF | ON | OCR APPLICATION | NON-COMPRESSION TRANSFER | ⎫ 906 |
| | | | | CLOUD APPLICATION | NON-COMPRESSION TRANSFER | |
| | | | | OTHERS | NON-COMPRESSION TRANSFER | ⎭ |
| | | | OFF | OCR APPLICATION | NON-COMPRESSION TRANSFER | ⎫ 907 |
| | | | | CLOUD APPLICATION | NON-COMPRESSION TRANSFER | |
| | | | | OTHERS | NON-COMPRESSION TRANSFER | ⎭ |
| | | TIFF/PNG | ON | OCR APPLICATION | NON-COMPRESSION TRANSFER | ⎫ 908 |
| | | | | CLOUD APPLICATION | NON-COMPRESSION TRANSFER | |
| | | | | OTHERS | NON-COMPRESSION TRANSFER | ⎭ |
| | | | OFF | OCR APPLICATION | NON-COMPRESSION TRANSFER | ⎫ 909 |
| | | | | CLOUD APPLICATION | NON-COMPRESSION TRANSFER | |
| | | | | OTHERS | NON-COMPRESSION TRANSFER | ⎭ |
| | ADF | JPEG/PDF | ON | OCR APPLICATION | COMPRESSION TRANSFER | ⎫ 910 |
| | | | | CLOUD APPLICATION | COMPRESSION TRANSFER | |
| | | | | OTHERS | COMPRESSION TRANSFER | ⎭ |
| | | | OFF | OCR APPLICATION | COMPRESSION TRANSFER | ⎫ 911 |
| | | | | CLOUD APPLICATION | COMPRESSION TRANSFER | |
| | | | | OTHERS | COMPRESSION TRANSFER | ⎭ |
| | | TIFF/PNG | ON | OCR APPLICATION | COMPRESSION TRANSFER | ⎫ 912 |
| | | | | CLOUD APPLICATION | COMPRESSION TRANSFER | |
| | | | | OTHERS | COMPRESSION TRANSFER | ⎭ |
| | | | OFF | OCR APPLICATION | COMPRESSION TRANSFER | ⎫ 913 |
| | | | | CLOUD APPLICATION | COMPRESSION TRANSFER | |
| | | | | OTHERS | COMPRESSION TRANSFER | ⎭ |

FIG. 9B

| 900 INTERFACE | 901 READING METHOD | 902 SAVE FORMAT | 903 SPECIFIC IMAGE PROCESSING | 904 TRANSFER DESTINATION APPLICATION | 905 TRANSFER METHOD | |
|---|---|---|---|---|---|---|
| LAN | Book | JPEG/PDF | ON | OCR APPLICATION | NON-COMPRESSION TRANSFER | ⎱ 914 |
| | | | | CLOUD APPLICATION | NON-COMPRESSION TRANSFER | |
| | | | | OTHERS | NON-COMPRESSION TRANSFER | |
| | | | OFF | OCR APPLICATION | NON-COMPRESSION TRANSFER | ⎱ 915 |
| | | | | CLOUD APPLICATION | COMPRESSION TRANSFER | |
| | | | | OTHERS | COMPRESSION TRANSFER | |
| | | TIFF/PNG | ON | OCR APPLICATION | NON-COMPRESSION TRANSFER | ⎱ 916 |
| | | | | CLOUD APPLICATION | NON-COMPRESSION TRANSFER | |
| | | | | OTHERS | NON-COMPRESSION TRANSFER | |
| | | | OFF | OCR APPLICATION | NON-COMPRESSION TRANSFER | ⎱ 917 |
| | | | | CLOUD APPLICATION | NON-COMPRESSION TRANSFER | |
| | | | | OTHERS | NON-COMPRESSION TRANSFER | |
| | ADF | JPEG/PDF | ON | OCR APPLICATION | COMPRESSION TRANSFER | ⎱ 918 |
| | | | | CLOUD APPLICATION | COMPRESSION TRANSFER | |
| | | | | OTHERS | COMPRESSION TRANSFER | |
| | | | OFF | OCR APPLICATION | COMPRESSION TRANSFER | ⎱ 919 |
| | | | | CLOUD APPLICATION | COMPRESSION TRANSFER | |
| | | | | OTHERS | COMPRESSION TRANSFER | |
| | | TIFF/PNG | ON | OCR APPLICATION | COMPRESSION TRANSFER | ⎱ 920 |
| | | | | CLOUD APPLICATION | COMPRESSION TRANSFER | |
| | | | | OTHERS | COMPRESSION TRANSFER | |
| | | | OFF | OCR APPLICATION | COMPRESSION TRANSFER | ⎱ 921 |
| | | | | CLOUD APPLICATION | COMPRESSION TRANSFER | |
| | | | | OTHERS | COMPRESSION TRANSFER | |

TRANSFER CONTROLLING METHOD, TRANSFER CONTROLLING APPARATUS, AND STORAGE MEDIUM STORING PROGRAM

BACKGROUND OF THE INVENTION

1. Field of the Invention

The present invention relates to a transfer controlling method and transfer controlling apparatus for controlling transfer of image data, and a storage medium storing a program.

2. Description of the Related Art

In some cases, an image reading apparatus having an image reading function, such as a scanner or digital camera, optically reads an image, and transfers the image data to an information processing apparatus such as a PC, tablet PC, smartphone, or Web server. In this case, methods for transferring image data to the information processing apparatus are roughly classified into a non-compression transfer method and a compression transfer method. The non-compression transfer method is a transfer method of directly transferring image data read by the image reading apparatus as uncompressed data without compressing the image data. In contrast, the compression transfer method is a method of compressing image data by JPEG encoding or the like by the image reading apparatus and then transferring the compressed image data. Japanese Patent Laid-Open No. 2005-215954 describes that a data compression method at the time of forming an image is decided based on the type of interface and image forming conditions.

The non-compression transfer method has an advantage in which high-quality image data free from degradation of image data is transferred to the information processing apparatus, and when the information processing apparatus performs image processing or the like after transfer, a high-precision processing result can be easily obtained. To the contrary, the non-compression transfer method has a disadvantage in which the data amount is large, and the traffic load, the CPU load, or the I/O load on a disk such as a hard disk or SSD in a transfer destination device becomes large.

In contrast, the compression transfer method has an advantage in which the data amount is small, and the traffic load, the CPU load, or the I/O load on a disk can be suppressed. However, the information processing apparatus performs image processing or the like on a degraded image, and it is difficult to obtain a high-precision result. For example, if the information processing apparatus performs character recognition or the like on image data JPEG-encoded by the image reading apparatus, image recognition readily fails because mosquito noise exists at a character portion owing to JPEG encoding. In this manner, the non-compression transfer method and the compression transfer method have a tradeoff relationship.

In Japanese Patent Laid-Open No. 2005-215954, a data compression method at the time of transferring an image is decided based on the type of interface at the time of transferring an image, and image processing to be executed in the apparatus itself that transfers an image. However, image processing to be executed on image data at the transfer destination of the image data is not taken into account. Hence, the image data may be transferred in a data format not suited to image processing at the transfer destination. For example, processing of recognizing a character in scanned image data and rotating the orientation of the image is sometimes performed as image processing to be executed at the transfer destination. In this image processing, the character portion is recognized from the scanned image data, and the entire image data is rotated in accordance with the orientation of the character. If the image reading apparatus compresses the image data by JPEG encoding or the like, the character portion is degraded, and the character recognition cannot be performed at high precision, resulting in a poor image processing precision.

If the non-compression transfer method is selected without exception in consideration of the fact that no proper image processing result is obtained, the traffic load, the CPU load, and the I/O load on a disk such as a hard disk or SSD in the transfer destination device are increased. It is very hard for the user to uniquely decide the non-compression transfer method or the compression transfer method while considering the tradeoff between a decrease in the precision of image processing or the like by the compression transfer method, and the traffic load, CPU load, and I/O load by the non-compression transfer method.

SUMMARY OF THE INVENTION

An aspect of the present invention is to eliminate the above-mentioned problems with the conventional technology. The present invention provides a transfer controlling method and transfer controlling apparatus for appropriately deciding the data format of image data to be transferred, and a storage medium storing a program.

The present invention in one aspect provides a transfer controlling method comprising: a determination step of determining, based on system configuration information of an image reading apparatus and setting information corresponding to processing to be executed on image data in an external apparatus, a data format of the image data when the image reading apparatus transfers, to the external apparatus, the image data obtained by the image reading apparatus reading an original; and a transfer controlling step of performing control for transferring, from the image reading apparatus to the external apparatus, the image data of the data format determined in the determination step.

According to the present invention, the data format of image data to be transferred can be appropriately decided.

Further features of the present invention will become apparent from the following description of exemplary embodiments with reference to the attached drawings.

BRIEF DESCRIPTION OF THE DRAWINGS

FIG. 3 is a flowchart showing an outline of transfer controlling processing of the image reading apparatus;

FIG. 4 is a block diagram showing the block arrangement of an information processing apparatus;

FIG. 5 is a flowchart showing pull scan processing;

FIG. 6 is a flowchart showing push scan processing;

FIG. 7 is a view showing an example of an image reading setting screen;

FIG. 8 is a table showing a table for deciding a transfer method; and

FIGS. 9A and 9B are views showing another table for deciding a transfer method.

DESCRIPTION OF THE EMBODIMENTS

Figure 1:
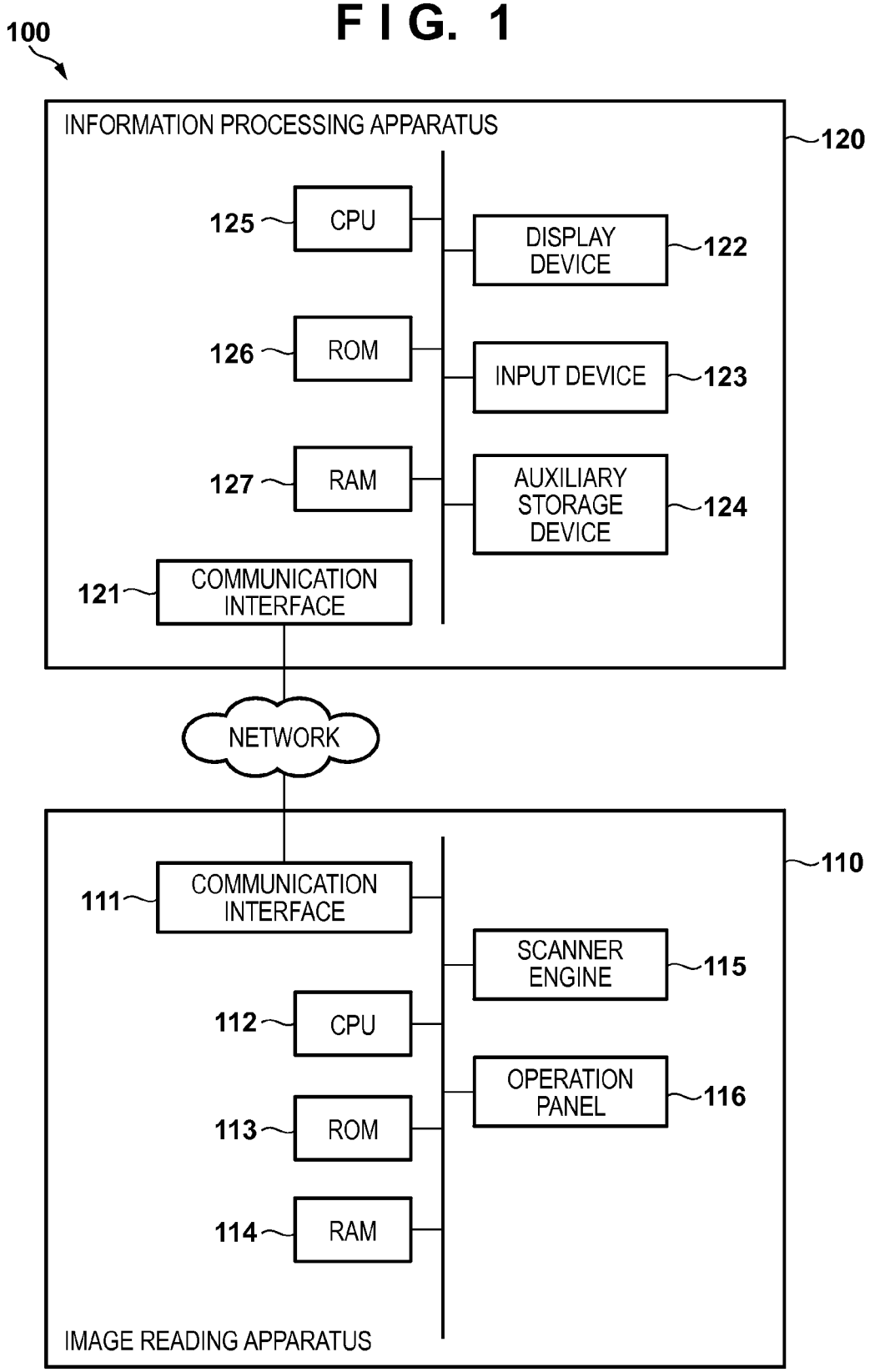
FIG. 1 is a block diagram showing the hardware arrangement of an information processing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[First Embodiment]

FIG. 1 is a block diagram showing the hardware arrangement of an information processing system. An information processing system 100 includes an information processing apparatus 120 and an image reading apparatus 110. The information processing apparatus 120, which is, for example, a general-purpose PC, issues an operation command (job) that instructs the image reading apparatus 110 about image reading. Upon receiving the image reading instruction from the information processing apparatus 120, the image reading apparatus 110 optically reads an image on an original set on an original table or the like or fed from an ADF (Auto Document Feeder), thereby generating image data. The image reading apparatus 110 transfers the generated image data to the information processing apparatus 120. The information processing apparatus 120 acquires the image data transferred from the image reading apparatus 110. As the transfer method, there are a compression transfer method of compressing and transferring image data, and a non-compression transfer method of transferring image data without compressing it. In this embodiment, the transfer method is decided in accordance with pieces of setting information set on an image reading setting screen.

The information processing apparatus 120 includes a communication interface 121, a display device 122, an input device 123, an auxiliary storage device 124, a CPU 125, a ROM 126, and a RAM 127. The communication interface 121 transfers/receives data to/from the image reading apparatus 110 via a network. The information processing apparatus 120 can mutually communicate via the communication interface 121 with even an external peripheral device connected to the network.

The display device 122 displays various user interface (UI) screens for designating execution of the respective functions of the image reading apparatus 110 based on software (applications and programs) installed in the information processing apparatus 120. The input device 123 includes, for example, a keyboard and a pointing device, and accepts operation information from the user. The auxiliary storage device 124 is, for example, an internal or external hard disk, and stores programs and the like regarding control of the image reading apparatus 110.

The CPU 125 implements the respective operations of the information processing apparatus 120 by loading various programs stored in the auxiliary storage device 124 and the ROM 126 into the RAM 127 and executing them. The ROM 126 stores various programs and various kinds of information for operating the information processing apparatus 120. For example, the ROM 126 stores basic software such as BIOS. The RAM 127 is used as the work area of the CPU 125, and temporarily stores software and various kinds of information.

The image reading apparatus 110 includes a communication interface 111, a CPU 112, a ROM 113, a RAM 114, a scanner engine 115, and an operation panel 116. The communication interface 111 transfers/receives data to/from the information processing apparatus 120 via the network. The CPU 112 controls the operation of the image reading apparatus 110 by loading the control program of the image reading apparatus 110 stored in the ROM 113 into the RAM 114 and executing it. The ROM 113 stores parameters necessary for the operation of the image reading apparatus 110, in addition to the control program. The RAM 114 is used as the work area of the CPU 112, and used as a temporary storage area for state information and image data of the image reading apparatus 110.

The scanner engine 115 includes a light source that emits light onto an original set on the original table (not shown), and a CCD color image sensor that reads and photoelectrically converts the reflected light. The scanner engine 115 scans an original set on the original table of the image reading apparatus 110, optically reads the original image, and generates image data corresponding to the read image. The operation panel 116 includes a display unit that displays a setting screen capable of accepting a user instruction for the state or each function of the image reading apparatus 110, and hard keys for inputting various instructions including a reading start instruction by the user. The operation panel 116 may take another form such as a touch panel. The image reading apparatus 110 may be a scanner dedicated machine, or a so-called MFP (MultiFunctional Peripheral) to which other functions such as a printer are further added.

When reading an original image, the original is set on the original table and scanned. However, it is also possible to provide an original conveyance mechanism such as an ADF, fix the scanner engine 115, and convey and scan an original. A reading start instruction from the image reading apparatus 110 is accepted via the operation panel 116. In addition to this arrangement, when it is detected that an original to be read has been set on the image reading apparatus 110, the information processing apparatus 120 may be notified of this. In this case, for example, the image reading apparatus 110 operates the scanner engine 115 under the control of the information processing apparatus 120. The image reading apparatus 110 may be a monochrome scanner or a film scanner that reads a film. Although the information processing apparatus 120 and the image reading apparatus 110 are connected via the network, they are not limited to this arrangement. For example, a USB may be connected to transmit/receive data in accordance with the USB standard.

Figure 2:
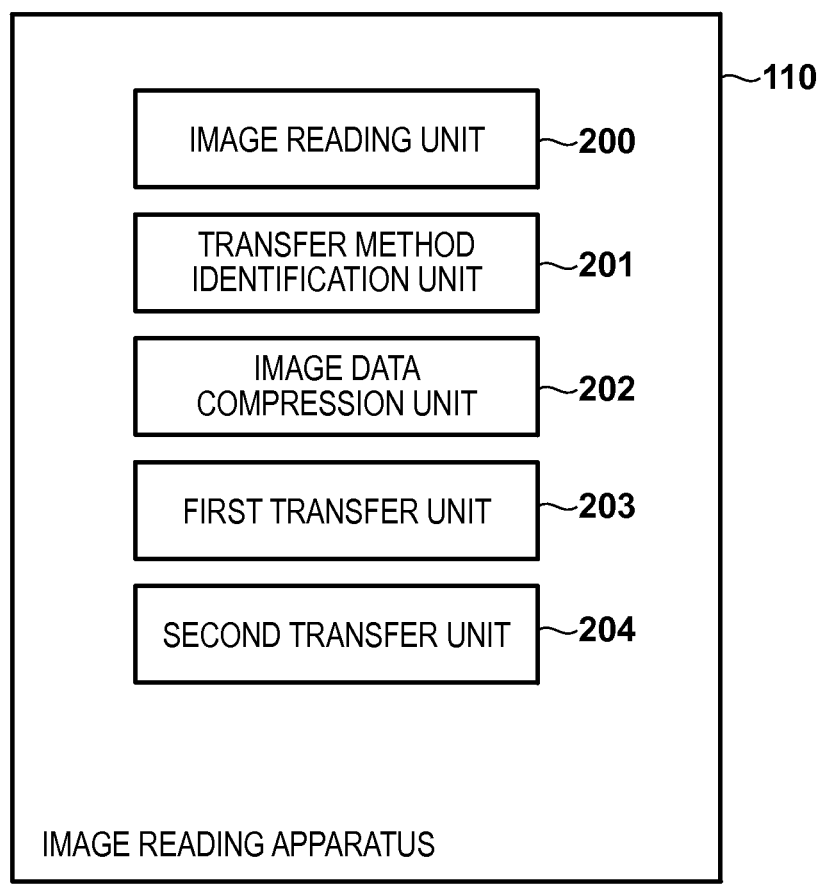
FIG. 2 is a block diagram showing the block arrangement of an image reading apparatus.

FIG. 2 is a block diagram showing the block arrangement of the image reading apparatus 110. The image reading apparatus 110 includes an image reading unit 200, a transfer method identification unit 201, an image data compression unit 202, a first transfer unit 203, and a second transfer unit 204. Each block of the image reading apparatus 110 will be described later in the explanation of the flowchart of FIG. 3.

FIG. 3 is a flowchart showing an outline of transfer controlling processing of the image reading apparatus 110. The processing shown in FIG. 3 is implemented by, for example, loading a program stored in the ROM 113 to the RAM 114 and executing it by the CPU 112. In step S101, when the image reading unit 200 receives an image reading instruction from the information processing apparatus 120, it starts image reading processing, reads an original image, and generates image data. As for the image reading instruction, a user operation may be accepted via the operation panel 116 of the image reading apparatus 110.

In step S102, the transfer method identification unit 201 determines (decides) which of the non-compression transfer method and compression transfer method is used as the transfer method. In step S102, the transfer method identification unit 201 makes this determination based on, for example, image reading settings included in the image reading instruction from the information processing apparatus 120, or image reading settings made in the image reading apparatus 110. Details of the determination processing will be described later with reference to FIGS. 8 and 9. If it is determined that the transfer method is the non-compression transfer method, the first transfer unit 203 transfers the image data to the information processing apparatus 120 (in an uncompressed state) without compressing the image data in step S103. If it is determined that the transfer method is the compression transfer method, the image data compression unit 202 compresses, by a predetermined compression method in step S104, the image data generated by reading by the image reading unit 200. In step S105, the second transfer unit 204 transfers the compressed image data to the information processing apparatus 120.

In the above-described processing of FIG. 3, when transmitting read image data from the image reading apparatus 110 to the information processing apparatus 120, the image reading apparatus 110 itself decides the data format of the image data. That is, the CPU 112 of the image reading apparatus 110 operates as a transfer controlling apparatus in this embodiment. Although the first transfer unit 203 transfers uncompressed image data in the above description, the present invention is not limited to this. For example, when the first transfer unit 203 supports a lossless compression method of losslessly compressing image data, it is also possible to compress image data generated by reading by the image reading apparatus 110 according to the lossless compression method, and transfer the image data to the information processing apparatus 120.

FIG. 4 is a block diagram showing the block arrangement of the information processing apparatus 120. The information processing apparatus 120 includes an application 400, a scanner application 401, and a scanner driver 402. When the user activates the scanner application 401, the scanner application 401 displays an image reading setting screen on the display device 122. When the scanner application 401 receives image reading settings and an image reading execution instruction from the user on the image reading setting screen, it starts image reading processing. After the start of the image reading processing, the scanner application 401 transmits an image reading instruction to the scanner driver 402 based on the image reading settings, and the scanner driver 402 transmits the image reading instruction to the image reading apparatus 110. When the scanner driver 402 receives image data from the image reading apparatus 110, it transfers the image data to the scanner application 401, and the scanner application 401 saves the transferred image data. The scanner application 401 transfers the saved image data to the application 400. At the time of saving the image data, the image data is sometimes saved in the file format.

The scanner application 401 includes a reading setting unit 403, a reading start unit 404, a transfer method determination unit 405, a reading setting instruction unit 406, an image data reception unit 407, an image processing unit 408, an image data save unit 409, and an image data transfer unit 410. The scanner driver 402 includes a reading setting instruction unit 411, an image data reception unit 412, an image processing unit 413, and an image data transfer unit 414. Each block of the information processing apparatus 120 will be described later in the explanation of the flowcharts of FIGS. 5 and 6.

Note that this embodiment exemplifies the information processing apparatus 120 including the application 400, the scanner application 401, and the scanner driver 402. In this arrangement, for example, these three programs may be implemented by one software, or the scanner application 401 and the scanner driver 402 may be constituted by one software. Further, each block mentioned above may be implemented in the image reading apparatus 110. For example, the transfer method may be determined based on image reading settings held by the image reading apparatus 110.

In the processing of FIG. 3, when the image reading apparatus 110 transmits read image data to the information processing apparatus 120, the data format of the image data is decided. FIGS. 5 and 6 show an example in which the data format of image data to be transferred from the image reading apparatus 110 is decided in the information processing apparatus 120 that receives read image data from the image reading apparatus 110. That is, in FIGS. 5 and 6, the CPU 125 of the information processing apparatus 120 operates as a transfer controlling apparatus in this embodiment.

FIG. 5 is a flowchart showing processing (pull scan) when the user issues an image reading instruction from the information processing apparatus 120. In FIG. 5, the processing of the information processing apparatus 120 is implemented by, for example, loading a program stored in the ROM 126 to the RAM 127 and executing it by the CPU 125. Also, in FIG. 5, the processing of the image reading apparatus 110 is implemented by, for example, the CPU 112 loading a program stored in the ROM 113 into the RAM 114 and executing it.

In step S201, the reading setting unit 403 of the scanner application 401 accepts image reading settings from the user via the image reading setting screen displayed on the display device 122. In step S202, the reading setting unit 403 transfers an image reading start instruction accepted from the user to the reading start unit 404. Details of the image reading setting screen will be described later. Upon accepting the reading start instruction in step S202, the transfer method determination unit 405 determines (decides), in step S203 based on the settings accepted on the image reading setting screen to be described later with reference to FIG. 7, which of the non-compression transfer method and compression transfer method is used as the transfer method. In step S204, the reading setting instruction unit 406 instructs the scanner driver 402 about the reading settings accepted on the image reading setting screen and the transfer method determined by the transfer method determination unit 405. In step S205, the reading setting instruction unit 411 of the scanner driver 402 instructs the image reading apparatus 110 about the instructed reading settings and transfer method as an image reading instruction to the image reading apparatus 110.

In step S206, the image reading apparatus 110 starts image reading, and transfers image data generated by reading to the scanner driver 402 of the information processing apparatus 120. The image reading apparatus 110 transfers the image data to the scanner driver 402 by the transfer method instructed by the scanner driver 402. In step S207, the image data reception unit 412 of the scanner driver 402 receives the image data from the image reading apparatus 110. In step S208, the image processing unit 413 executes predetermined image processing on the image data. The predetermined image processing is, for example, processing of detecting the orientation of a text original and rotating an image. In step S209, the image data transfer unit 414 transfers the image data to the scanner application 401.

In step S211, the image processing unit 408 of the scanner application 401 executes predetermined image processing on the image data transferred from the scanner driver 402. The predetermined image processing is, for example, character recognition processing. In step S212, the image data save unit 409 saves the image data having undergone the image processing. In step S213, the image data transfer unit 410 transfers the saved image data to the application 400 set in advance on the image reading setting screen. The preset application 400 is, for example, a mailer or OCR application, which will be described later with reference to FIG. 7.

FIG. 6 is a flowchart showing (push scan) processing of issuing an image reading instruction by the user from the image reading apparatus 110. In push scan, the user performs an operation with respect to the image reading apparatus 110 in order to start image reading, but a reading instruction is issued from the information processing apparatus 120 to the image reading apparatus 110. In FIG. 6, as in FIG. 5, the data format of image data to be transferred from the image reading apparatus 110 is decided in the information processing apparatus 120 that receives read image data from the image reading apparatus 110.

FIG. 6 is different from FIG. 5 in the processes of steps S301 to S303. In step S301, image reading settings are accepted from the user via the image reading setting screen displayed on the operation panel 116 of the image reading apparatus 110. In step S302, the image reading apparatus 110 accepts an image reading start instruction from the user. In step S303, upon accepting the image reading start instruction, the image reading apparatus 110 transmits the image reading settings accepted via the image reading setting screen to the scanner application 401 of the information processing apparatus 120. The subsequent processes in steps S304 to S314 are the same as those in the explanation of steps S203 to S213 of FIG. 5.

FIG. 7 is a view showing an example of an image reading setting screen. The user inputs image reading settings on an image reading setting screen 700, and then designates the start of image reading (scanning). The image reading setting screen 700 is provided by the scanner application 401 of the information processing apparatus 120 at the time of executing pull scan, and provided by the image reading apparatus 110 at the time of executing push scan. The image reading setting screen 700 is roughly classified into a loading setting 701, a save setting 702, and an application setting 703.

The loading setting 701 is a setting regarding image reading, and includes the items of an original type 704, color mode 705, resolution 706, and image processing setting 707. The original type 704, color mode 705, and resolution 706 are provided as list boxes, and the user can select a desired setting from each list. The image processing setting 707 is provided by a check box, and the user can select whether to set image processing. As the image processing, FIG. 7 shows, for example, processing of detecting the orientation of a text original and rotating an image.

The save setting 702 is a setting when loading image data and saving it as a file. The save setting 702 includes the items of a file name 708, save location 709, and data format 710.

The application setting 703 is a setting regarding an application at a destination to which a saved file is transferred. The application setting 703 includes a "transfer to application" item 711, "attach to mail" item 712, and "execute OCR" item 713. The user can select a desired application from the list box of one of the items 711 to 713. The saved image file is transferred to the application selected in the application setting 703. FIG. 7 shows an example in which the item 711 is selected. An application A is selected as a corresponding application. In the setting of FIG. 7, scanned image data is transferred to the application A.

In this embodiment, an item for deciding a transfer method by the user is not provided on the image reading setting screen 700. Conventionally, the transfer method is provided as one item of the loading setting 701, and either the compression transfer method or non-compression transfer method is selected from a list box or the like. In this embodiment, the transfer method is decided based on the setting contents of the loading setting 701, save setting 702, and application setting 703. Therefore, the transfer method can be appropriately decided without requiring a user operation.

FIG. 8 is a table showing an example of a table for deciding a transfer method. In step S102 of FIG. 3, step S203 of FIG. 5, and step S304 of FIG. 6, the transfer method is decided by looking up the table of FIG. 8 based on settings on the image reading setting screen 700. In this embodiment, an interface 800, a reading method 801, a save format 802, and specific image processing 803 are set as the condition items of image reading settings for deciding a transfer method 804. As for the interface 800, the USB and LAN are set as setting contents. As for the reading method 801, Book (original table) and the ADF are set as setting contents. That is, the interface 800 and the reading method 801 are an example of system configuration information representing a network configuration or hardware configuration for executing image reading. As for the save format 802, JPEG, PDF, PNG, and TIFF are set as setting contents. The save format 802 is an example of setting information of image data. As for the specific image processing 803, ON and OFF are set as setting contents. The specific image processing 803 is an example of system configuration information (software configuration information) for executing image reading.

First, the interface 800 will be explained. Since the transfer rate of the USB is higher than that of the LAN in general, the time taken to transfer image data to the information processing apparatus 120 is hardly shortened even by compression transfer, and transfer by the USB has only a disadvantage in which degraded image data is transferred. In this embodiment, therefore, the non-compression transfer method is basically selected when the interface 800 is the USB, and the compression transfer method is basically selected when the interface 800 is the LAN. Note that the decision criterion of basically selecting the non-compression transfer method when the interface 800 is the USB, and basically selecting the compression transfer method when the interface 800 is the LAN is merely an example, and another decision criterion may be employed in deciding a transfer method. For example, when even the LAN uses a communication method capable of higher-speed communication, the non-compression transfer method may be selected. Alternatively, it is also possible to measure an actual interface communication speed, and select the non-compression transfer method based on this communication speed.

Although the reading method 801 includes Book and the ADF, this embodiment assumes that the image reading apparatus 110 does not support the non-compression transfer method in the case of the ADF. In this embodiment, when the reading method 801 is the ADF, the compression transfer method is always selected. In the above explanation, when the interface 800 is the USB, the non-compression transfer method is basically selected. However, when the reading method 801 is the ADF, the non-compression transfer method is not supported, and the compression transfer method is selected even in the case of the USB.

Next, the save format 802 will be explained. The save format 802 is a save format used when a read image is transferred from the image reading apparatus 110 to the information processing apparatus 120 and the file of the read image is saved in the information processing apparatus 120. In general, when the save format 802 is TIFF, uncompressed data or losslessly compressed data is saved. When, therefore, TIFF is selected in the data format 710, it is considered that the user wants a high-quality image. When PNG is selected in the data format 710, it is considered that the user wants a high-quality image, as in TIFF, because PNG adopts the lossless compression method. In this manner, when the save format is TIFF or PNG, it is considered that the user wants a high-quality image, so the non-compression transfer method is selected. However, when the reading method 801 is the ADF, the compression transfer method is selected because the non-compression transfer method is not supported.

Note that when the save format is TIFF/PNG and a read image is transferred in a non-compression format, the information processing apparatus 120 executes lossless compression (image processing). As a result, the file of a read image is generated in the TIFF/PNG format and saved in the auxiliary storage device 124 of the information processing apparatus 120.

When JPEG is selected in the data format 710, it is considered that the user wants a high transfer rate rather than a high-quality image because a lossy compression method is often employed in general. Even when PDF is selected in the data format 710, it is considered that the user wants a high transfer rate rather than a high-quality image because JPEG encoding is often used for the format of image data in the PDF. In this fashion, when the data format 710 is JPEG or PDF, it is considered that the user does not want high-quality image data, so the compression transfer method is basically selected.

For example, when the save format is PDF, the information processing apparatus 120 performs image processing for saving, as a PDF file, a read image of a lossy compression format transferred from the image reading apparatus 110. Especially when generating a PDF file including images of a plurality of pages, the information processing apparatus 120 performs processing of sequentially receiving, from the image reading apparatus 110, a plurality of read images of the lossy compression format that correspond to the respective pages, and saving these read images as one file of the PDF format.

In some cases, the JPEG format is used as a data format when transferring a read image by the lossy compression format from the image reading apparatus 110. In this case, when the save format is JPEG/PDF, the information processing apparatus 120 need not perform JPEG compression processing anew on the read image.

Note that the arrangement in which the non-compression transfer method is selected when the save format 802 is TIFF/PNG, and the compression transfer method is selected when it is JPEG/PDF is merely an example, and the present invention is not particularly limited to this arrangement. For example, when image data is compressed by the lossless compression method even for JPEG, the non-compression transfer method may be selected. Even when PDF is adopted, if image data is saved by a high-image-quality PDF, the non-compression transfer method may be selected. It may be configured to arbitrarily change the transfer method in accordance with the save format 802.

Next, the specific image processing 803 will be explained. The specific image processing 803 indicates image processing that may decrease the precision when the information processing apparatus 120 executes image processing on image data that has been transmitted from the image reading apparatus 110 by the compression transfer method. For example, in character recognition processing for performing correction regarding a character, if image processing is executed on image data compressed by JPEG encoding, JPEG-specific mosquito noise may be superimposed on a character portion, decreasing the precision of image processing. When executing the specific image processing 803, it is preferable to select not the compression transfer method but the non-compression transfer method. In the above explanation, when the save format 802 is JPEG/PDF, the compression transfer method is basically selected. However, when the specific image processing 803 is executed (ON), the non-compression transfer method is selected in accordance with the setting.

FIGS. 9A and 9B are tables showing an example of a table obtained by adding the condition of a transfer destination application 904 to the conditions shown in FIG. 8. FIGS. 9A and 9B show an OCR application, a cloud application, and other applications as examples of the transfer destination application 904. When the transfer destination application 904 is the OCR application, it performs character recognition processing. Thus, the precision of character recognition can be maintained by transferring not compressed data encoded by JPEG or the like, but uncompressed image data. Therefore, when the transfer destination application 904 is the OCR application, the non-compression transfer method is selected.

When the transfer destination application 904 is the cloud application, the cloud service may impose a restriction on capacity, or the time taken to upload data to the cloud service may become long if the size of image data is large. Hence, when the transfer destination application 904 is the cloud application, the compression transfer method is selected.

In FIGS. 9A and 9B, a combination of respective setting contents and the compression transfer method/non-compression transfer method are associated to basically put higher priority on maintenance of the image quality than on the transfer rate of image data. In a setting 906 of FIG. 9A, specific image processing 903 is ON, and the non-compression transfer method is decided as the transfer method in order to maintain the image quality even if a save format 902 is JPEG/PDF.

In a setting 907, the non-compression transfer method is decided as the transfer method in order to maintain the image quality for the OCR application. In the setting 907, an interface 900 is a USB, the speed is high, and the non-compression transfer method is decided as the transfer method even for the cloud application and other applications.

In a setting 908, the save format 902 is TIFF/PNG, the specific image processing 903 is ON, and the non-compression transfer method is decided as the transfer method in order to maintain the image quality. In a setting 909, the save format 902 is TIFF/PNG, and the non-compression transfer method is decided as the transfer method in order to maintain the image quality. In the settings 908 and 909, the non-compression transfer method is decided for the cloud application. However, it is also possible to give priority to the cloud capacity rather than the image quality, and decide the compression transfer method as the transfer method for the cloud application.

In settings 910 to 913, the reading method 901 is the ADF. Since the non-compression transfer method is not supported, the compression transfer method is decided as the transfer method.

In a setting 914, the transfer method is decided based on the same determination criterion as that for the setting 906. A setting 915 is different from the setting 907 in the cloud application and other applications. As for the OCR application, the non-compression transfer method is decided based on the same determination criterion as that for the setting 907. In the setting 915, the interface 900 is the LAN, the speed is low, the save format 902 is JPEG/PDF, and the user wants a high transfer speed. Therefore, the compression transfer method is decided as the transfer method for the cloud application and other applications.

In a setting 916, the transfer method is decided based on the same determination criterion as that for the setting 908. In a setting 917, the transfer method is decided based on the same determination criterion as that for the setting 909. In settings 918 to 921, the transfer method is decided based on the same determination criterion as that for the settings 910 to 913.

Although this embodiment has explained that the user activates the scanner application 401, the present invention is not limited to this arrangement. For example, it is also possible to activate the application 400 by the user, activate the scanner application 401 by the application 400, and perform image reading. In this case, the scanner application 401 transfers saved image data to the application 400. For example, when the application 400 is the OCR application, as described above, the transfer method is preferably the non-compression transfer method. In this arrangement, the activation source application 400 of the scanner application 401 serves as a condition at the time of selecting a transfer method.

This embodiment is also applicable to the image reading apparatus 110 capable of a transfer method of compressing image data by the lossless compression method and transferring it, and a transfer method of transferring image data by a lossy compression method. In this case, when the non-compression transfer method is selected according to FIGS. 8 and 9, the image reading apparatus 110 compresses image data by the lossless compression method, and transfers the image data to the information processing apparatus 120. The information processing apparatus 120 receives the image data compressed by the lossless compression method, and decodes the image data, thereby obtaining image data free from the influence of degradation. This arrangement can prevent a decrease in the precision of image processing even when the specific image processes 803 and 903 are ON.

FIGS. 8 and 9 show the interfaces 800 and 900, the reading methods 801 and 901, the save formats 802 and 902, the specific image processes 803 and 903, and the transfer destination application 904 as image reading setting items for selecting a transfer method. However, there may be another image reading setting item. For example, the transfer method may be selected based on the capacity of a destination at which image data is saved. The non-compression transfer method may be selected when image data generated by reading by the image reading apparatus 110 is transferred to a large-capacity server, and the compression transfer method may be selected when image data is transferred to a small-capacity server. The capacity of the transfer destination of image data may be measured at the time of reading an image, and the transfer method may be selected based on the measurement result. For example, when it is known in advance from the cloud service or the like that the capacity is smaller than a threshold, the compression transfer method may be selected.

Although this embodiment has explained a case in which image data generated by reading by the image reading apparatus 110 such as a scanner or a multifunctional peripheral is transferred to the information processing apparatus 120, the present invention is not limited to this arrangement. For example, the operation according to this embodiment is also applicable to a case in which image data generated by reading by the image reading apparatus 110 is transferred to, for example, a USB memory connected to the image reading apparatus 110. In this case, based on image reading settings made in the image reading apparatus 110, the image reading apparatus 110 selects a transfer method of transferring image data to the USB memory.

Although this embodiment has explained an example in which this embodiment is applied to the image reading apparatus 110 such as a scanner or a multifunctional peripheral, the present invention is not limited to this arrangement. For example, this embodiment is also applicable to a case in which image data of a digital camera is transferred to the information processing apparatus 120, and a case in which image data saved in a memory card is transferred to the information processing apparatus 120. This embodiment is also applicable to a case in which, for example, an image file saved after shooting by a digital camera is transferred to a PC or a cloud service. In this case, the digital camera corresponds to the image reading apparatus 110 according to this embodiment, and the PC or cloud service corresponds to the information processing apparatus 120 according to this embodiment. In this arrangement, for example, image data is transferred by the non-compression transfer method when sending image data obtained by shooting by the digital camera to the PC, and by the compression transfer method when sending it to the cloud service. In addition, this embodiment is also applicable to a case in which the transfer method is selected based on settings at the time of shooting by the digital camera. For example, image data is transferred by the non-compression transfer method in shooting in a high image quality mode, and by the compression transfer method in shooting in a low image quality mode. In this manner, the priority may be decided in advance between the setting contents of a plurality of condition items, and the transfer method may be decided in accordance with a setting content with high priority.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139164, filed Jul. 4, 2014, which is hereby incorporated by reference herein in its entirety.

What is claimed is:

1. A transfer controlling method comprising:
an accepting step of accepting, on a setting screen, a setting for image data obtained by reading of an original performed in an image reading apparatus;
a determination step of determining, based on the setting accepted in the accepting step and system configuration provided in the image reading apparatus, a data format of the image data to be transferred by the image reading apparatus to an external apparatus; and
a transfer controlling step of performing control for transferring, from the image reading apparatus to the external apparatus, the image data of the data format determined in the determination step.

2. The method according to claim 1, wherein in the determination step, one of a lossy compression format, a lossless compression format, and a non-compression format is determined as the data format of the image data.

3. The method according to claim 1, wherein
a determination criterion in the determination step is comprised by a plurality of items, and
in the determination step, the data format is determined in accordance with the plurality of items.

4. The method according to claim 3, wherein
priority is set between the plurality of items, and
in the determination step, the data format is determined in accordance with an item having higher priority.

5. The method according to claim 3, wherein one, of the plurality of items, which is maintenance of image quality of the image data has a priority higher than that of another, of the plurality of items, which is a transfer rate of the image data.

6. The method according to claim 1, wherein the setting includes a save format for saving the image data in the external apparatus.

7. The method according to claim 1, wherein the system configuration includes a hardware configuration in the image reading apparatus.

8. The method according to claim 7, wherein the hardware configuration includes at least one of a network configuration between the image reading apparatus and the external apparatus, and a reading configuration of the image reading apparatus.

9. The method according to claim 1, wherein the setting includes image processing to be executed on the image data in the external apparatus.

10. The method according to claim 9, wherein the image processing includes character recognition processing.

11. The method according to claim 1, wherein
the determination step and the transfer controlling step are executed in the image reading apparatus, and
in the transfer controlling step, processing of transferring the image data to the external apparatus is executed.

12. The method according to claim 1, wherein,
in a case where the determination step and the transfer controlling step are executed in the external apparatus, and
in the transfer controlling step, processing of causing the image reading apparatus to transfer the image data to the external apparatus is executed.

13. The method according to claim 1, wherein the determination step determines the data format of the image data, as a transfer method for transferring the image data between the image reading apparatus and the external apparatus.

14. The method according to claim 13, wherein the determination step determines the transfer method by referring to a table defining the transfer method corresponding to a combination of the setting and the system configuration.

15. A transfer controlling apparatus comprising:
an accepting unit configured to accept, on a setting screen, a setting for image data obtained by reading of an original performed in an image reading apparatus;
a determination unit configured to determine, based on the setting accepted by the accepting unit and system configuration of provided in the image reading apparatus, a data format of the image data to be transferred by the image reading apparatus to an external apparatus; and
a transfer controlling unit configured to perform control for transferring, from the image reading apparatus to the external apparatus, the image data of the data format determined by the determination unit
wherein one or more of the accepting unit, the determination unit, and the transfer controlling unit is implemented by a processor and a memory.

16. The apparatus according to claim 15, wherein the setting includes a save format for saving the image data in the external apparatus.

17. The apparatus according to claim 15, wherein the system configuration includes a hardware configuration in the image reading apparatus.

18. The apparatus according to claim 17, wherein the hardware configuration includes at least one of a network configuration between the image reading apparatus and the external apparatus, and a reading configuration of the image reading apparatus.

19. The apparatus according to claim 15, wherein the setting includes image processing to be executed on the image data in the external apparatus.

20. A non-transitory computer-readable storage medium storing a program for causing a computer to execute a transfer controlling method comprising:
an accepting step of accepting, on a setting screen, a setting for image data obtained by reading of an original performed in an image reading apparatus;
a determination step of determining, based on the setting accepted in the accepting step and system configuration provided in the image reading apparatus, a data format of the image data to be transferred by the image reading apparatus to an external apparatus; and
a transfer controlling step of performing control for transferring, from the image reading apparatus to the external apparatus, the image data of the data format determined in the determination step.

* * * * *